United States Patent Office 3,141,017
Patented July 14, 1964

3,141,017
ACETALS AND KETALS OF 12α-DIHYDROXYPRO-
GESTERONE AND 1-DEHYDRO-12α,17α-DIHY-
DROXYPROGESTERONE
Patrick A. Diassi, Westfield, N.J., assignor to Olin
Mathieson Chemical Corporation, New York, N.Y., a
corporation of Virginia
No Drawing. Filed Nov. 30, 1962, Ser. No. 241,173
6 Claims. (Cl. 260—239.55)

This invention relates to new acetals and ketals of 12α,17α-dihydroxyprogesterone and of 1-dehydro-12α,17α-dihydroxyprogesterone. More particularly the invention relates to novel compounds of the structural formula (I)
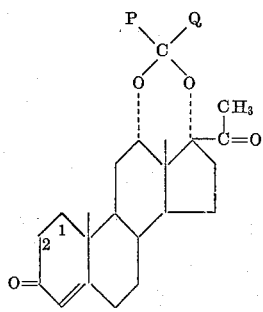

In the compounds of Formula I, the 1,2-position may be saturated (12α,17α-dihydroxyprogesterone derivatives) or there may be a double bond in that position (1-dehydro-12α,17α-dihydroxyprogesterone derivatives).

P in Formula I represents hydrogen, lower alkyl, halo-lower alkyl, carboxy-lower alkyl (or a salt thereof, e.g., an alkali metal salt such as the potassium salts or an alkaline earth metal salt such as the barium salt, or an ester thereof, e.g., an alkyl ester, especially a lower alkyl ester such as methyl or isopropyl ester), monocyclic cycloalkyl, monocyclic aryl, monocyclic aryl lower alkyl, monocyclic heterocyclic or monocyclic heterocyclic lower alkyl. Q represents lower alkyl, halo-lower alkyl, carboxy-lower alkyl (or a salt or ester thereof), monocyclic cycloalkyl, monocyclic aryl, monocyclic aryl-lower alkyl, monocyclic heterocyclic or monocyclic heterocyclic-lower alkyl. In addition, P and Q may join to each other and together with the carbon to which each is attached form a cycloalkyl or monocyclic heterocyclic group.

The lower alkyl groups represented by P and Q, as well as those groups which form part of larger substituents represented by the symbols, are straight or branched chain saturated aliphatic hydrocarbon groups such as methyl, ethyl, propyl, isopropyl, butyl, isobutyl, t-butyl, amyl and the like. When P represents hydrogen, it is desirable that an alkyl group represented by Q have at least two carbon atoms. Any of the four halogens may be attached to an alkyl group to form a halo-lower alkyl group, but chlorine and bromine are preferred.

The cycloalkyl groups represented by P and Q are 3 to 7 membered alicyclics but cyclopentyl and cyclohexyl are preferred. P and Q may also form such an alicyclic together with the carbon atom to which they are joined.

The monocyclic aryl groups represented by the symbols are single ring aromatic radicals, principally phenyl or simply substituted phenyl groups represented by the formula (II)
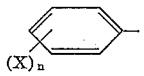

wherein X represents hydrogen, lower alkyl, halogen, lower alkoxy, and $n$ represents 1, 2 or 3. The substituents X are of the same character as those described above.

The groups represented by II may also be joined to a lower alkyl group to form the monocyclic aryl-lower alkyl groups referred to above.

Monocyclic heterocyclics represented by the symbols individually or together with the connective carbon include 5 to 7 membered nitrogen, oxygen or sulfur heterocyclics in which there are 1 or 2 of the hetero atoms. Nitrogen heterocyclics are preferred. The heterocyclic (represented by P or Q individually) may also be attached to a lower alkyl group of the character already described. (X)$_n$ may also be attached to the heterocyclic in the same manner as described above in connection with the aryl groups.

Illustrative of the heterocyclic groups are the following: picoline, thiophene, furan, morpholine, piperidine, piperazine, thiamorpholine, etc., as well as simply substituted heterocyclics of this character.

Preferred are those compounds wherein the 1,2-position is saturated and P and Q are each lower alkyl.

The compounds of this invention are physiologically active substances which possess progestational activity when administered orally in conventional dosage forms such as tablets, capsules, suspensions and the like. They may be used in place of known progestational agents such as progesterone for the same indications, e.g., habitual abortion, the dosage being adjusted for the relative potency of the particular compound and the individual response thereto.

The compounds of this invention are produced by reacting 12α,17α-dihydroxyprogesterone (J. Chem. Soc., 1954, pp. 1825–1836) with an aldehyde of at least two carbon atoms or ketone. The reaction is preferably carried out by treating a suspension or solution of the steroid in the aldehyde or ketone (or an organic solvent if the aldehyde or ketone is a solid) with an acid catalyst (e.g., perchloric acid, p-toluene sulfonic acid, and hydrochloric acid), neutralizing the acid and removing the cyclic acetal or ketal derivative formed.

Suitable aldehyde and ketone reactants include lower alkanals of at least two carbon atoms, such as paraldehyde, propanal, and hexanal; di(lower alkyl)ketones, such as acetone, diethylketone, dibutylketone, methylethylketone, and methylisobutylketone; cycloalkanones, such as cyclobutanone, cyclopentanone, cyclohexanone, suberone, and cycloheptanone; mono and dicycloalkyl ketones, such as cyclohexylmethylketone and dicyclopropylketone, halolower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g. p-chlorobenzaldehyde and p-fluorobenzaldehyde), lower alkoxybenzaldehydes (e.g. o-anisaldehyde), di(lower alkoxy)benzaldehydes (e.g. veratraldehyde), hydroxybenzaldehydes (e.g. salicylaldehyde), dihydroxybenzaldehydes (e.g. resorcylaldehyde), lower alkyl benzaldehydes (e.g. m-tolualdehyde and p-ethylbenzaldehyde), di(lower alkyl)benzaldehydes (e.g. o,p-dimethylbenzaldehyde), nitrobenzaldehydes, acylamidobenzaldehydes (e.g. N-acetylanthranilaldehyde), and cyanobenzaldehydes; monocyclic carbocyclic aromatic lower alkanals, such as phenylacetaldehyde, α-phenylpropionaldehyde, β-phenylpropionaldehyde, γ-phenylbutyraldehyde, and aromatically-substituted halo, lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; 1-(monocyclic carbocyclic aromatic)substituted lower alkanals, such as acetophenone, α,α,α-trifluoroacetophenone, propiophenone, butyrophenone, valerophenone, isocaprophenone, halo-phenyl lower alkyl ketones (e.g. p-chloroacetophenone and p-chloropropiophenone), (lower alkoxy)phenyl lower alkyl ketones (e.g. p-anisyl methyl ketone), di(lower alkoxy)phenyl lower alkyl ketones, hydroxy-phenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl)phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically-substituted derivatives thereof; 1-(monocyclic heterocyclic) substituted lower alkanals, such as 2-acetylfuran, 2-benzoylfuran, and 2-acetylthiophene; oxo substituted monocyclic heterocyclics, such as alloxan; monocyclic heterocyclic lower alkanones; and oxo lower alkanoic acids such as glyoxylic, pyruvic, acetoacetic, β-ketopropionic, α-ketobutyric, levulinic, β-ketocaproic and β-ketocaprylic acid [as well as salts and esters thereof, such as the lower alkyl esters (e.g. methyl and ethyl)].

Reaction of the 12,17-acetals and ketals of 12α,17α-dihydroxyprogesterones with 2,3-dichloro-5,6-dicyanobenzoquinone yields the 1-dehydro derivatives.

The following examples are illustrative of the invention, all temperatures are in degrees centigrade.

EXAMPLE 1

*12α,17α-Dimethylmethylenedioxyprogesterone*

(a) To 300 mg. of 12α,17α-dihydroxyprogesterone, a solution of 18 ml. of acetone containing 0.012 ml. of 70% perchloric acid is added and the mixture stirred at room temperature for five hours. The steroid dissolves completely in fifteen minutes. The solution is neutralized with dilute sodium bicarbonate and distributed between chloroform and water. The chloroform is washed again with water and evaporated to dryness. The residue is chromatographed on Woelm neutral alumina to give 159 mg. of 12α,17α-dimethylmethylenedioxyprogesterone, M.P. 185–187°, $[\alpha]_D^{22}$ +58° (chf.), $\lambda_{max}^{alc}$ 239 mμ ( $\epsilon$ =15,500), $\lambda_{max}^{nujol}$ 5.86, 5.99, 6.18μ

*Analysis.*—Calcd. for $C_{24}H_{34}O_7$ (386.51): C, 74.57; H, 8.87. Found: C, 74.48; H, 8.88.

(b) To 50 mg. of 12α,17α-dihydroxyprogesterone, 5.0 ml. of a solution of 10 mg. of p-toluenesulfonic acid in a mixture of 15 ml. of 2,2-dimethoxypropane and 4.0 ml. of dimethylformamide are added and the resulting solution heated at 70° C. for six hours. The solution is then neutralized with dilute sodium bicarbonate and evaporated to dryness in vacuo. The residue is distributed between chloroform and water and the chloroform separated and evaporated to dryness. The residue is chromatographed on Woelm neutral alumina to give 18 mg. of 12α,17α-dimethylmethylenedioxyprogesterone.

EXAMPLE 2

*12α,17α-(2'-Phenyl-2'-Methylmethylenedioxy)Progesterone*

(a) Following the procedure described in Example 1(a) but substituting acetophenone for the acetone and extending the reaction time to 24 hours, there is obtained on chromatography 12α,17α(2'-phenyl-2'-methylmethylenedioxy)progesterone.

(b) Following the procedure set forth in Example 1(b) but substituting α,α-dimethoxyethylbenzene for the dimethoxypropane, there is obtained following chromatography 12α,17α-(2'-phenyl-2'-methylmethylenedioxy)progesterone.

EXAMPLE 3

*1-Dehydro-12α,17α-Dimethylmethylenedioxyprogesterone*

A solution of 100 mg. of 12α,17α-dimethylmethylenedioxyprogesterone and 65 mg. of 2,3-dichloro-5,6-dicyanobenzoquinone in 4 ml. of dioxane is refluxed under nitrogen for 6 hours. After cooling, the precipitated 2,3-dichloro-5,6-dicyanohydroquinone is filtered and washed with dioxane. The filtrate is diluted with an equal volume of chloroform and adsorbed into 5 g. of Woelm neutral alumina (activity I). Elution with chloroform and crystallization of the residue after evaporation gives 1-dehydro-12α,17α-dimethylmethylenedioxyprogesterone.

EXAMPLE 4

*1-Dehydro-12α,17α-(2'-Phenyl-2'-Methylmethylenedioxy)Progesterone*

Following the procedure described in Example 3 but substituting 12α,17α-(2'-phenyl-2'-methylmethylenedioxy)progesterone for 12α,17α-dimethylmethylenedioxyprogesterone there is obtained 1-dehydro-12α,17α-(2'-phenyl-2'-methylmethylenedioxy)progesterone.

EXAMPLE 5

*12α,17α-(2'-Butylidene) Derivatives of 12α,17α-Dihydroxyprogesterone*

To a suspension of 100 mg. of 12α,17α-dihydroxyprogesterone in 15 ml. of methylethylketone is added 0.05 ml. of 72% perchloric acid, and the mixture stirred at room temperature for two hours. The resulting solution is neutralized with sodium bicarbonate solution and after addition of water the methylethylketone is evaporated in vacuo. The resulting crystals are filtered, washed with water and dried in vacuo.

EXAMPLE 6

*12α,17α-(4'-Methyl-2'-Pentylidene) Derivative of 12α,17α-Dihydroxyprogesterone*

To a suspension of 100 mg. of 12α,17α-dihydroxyprogesterone in 15 ml. of methylisobutylketone is added 0.05 ml. of 75% perchloric acid. The mixture is stirred at room temperature for 6 hours and the resulting solution extracted with dilute sodium bicarbonate solution, washed with water, the organic phase dried over sodium sulfate and the solvent evaporated in vacuo.

EXAMPLE 7

*12α,17α-Cyclohexylidene Derivative of 12α,17α-Dihydroxyprogesterone*

A suspension of 200 mg. of 12α,17α-dihydroxyprogesterone in 15 ml. of redistilled cyclohexanone is treated for two hours as described in Example 6. The resulting cyclohexylidene derivative is recrystallized from acetone-hexane.

EXAMPLE 8

*12α,17α-(3′-Pentylidene) Derivative of 12α,17α-Dihydroxyprogesterone*

A suspension of 200 mg. of 12α,17α-dihydroxyprogesterone in 30 ml. of diethylketone is treated for four hours as described in Example 6 to obtain the product.

EXAMPLE 9

*p-Nitroacetophenone Derivative of 12α,17α-Dihydroxyprogesterone*

To a suspension of 200 mg. of 12α,17α-dihydroxyprogesterone in a mixture of 7 ml. of dioxane and 4 grams of p-nitroacetophenone is added 0.05 ml. of 72% perchloric acid and the mixture stirred at room temperature for 3½ hours. The mixture is then neutralized with dilute sodium bicarbonate solution and the dioxane and excess p-nitroacetophenone removed by vacuum steam distillation. The residual aqueous suspension is extracted with chloroform, the chloroform layer washed with water, dried over sodium sulfate and the solvent removed in vacuo. The remaining derivative is purified by recrystallization from acetone-hexane.

EXAMPLE 10

*Benzaldehyde Derivative of 12α,17α-Dihydroxyprogesterone*

To a suspension of 100 mg. of 12α,17α-dihydroxyprogesterone in 15 ml. of benzaldehyde is added 0.05 ml. of 72% perchloric acid. The mixture is treated as in Example 1(a) and results in the formation of the benzaldehyde derivative of 12α,17α-dihydroxyprogesterone.

EXAMPLE 11

*Furfural Derivative of 12α,17α-Dihydroxyprogesterone*

Treatment of 12α,17α-dihydroxyprogesterone with furfural in the presence of perchloric acid according to the procedure of Example 1(a) results in the formation of the furfural derivative of 12α,17α-dihydroxyprogesterone.

EXAMPLE 12

*Benzophenone Derivative of 12α,17α-Dihydroxyprogesterone*

Treatment of 12α,17α-dihydroxyprogesterone with benzophenone as described in Example 1(a) furnishes the benzophenone derivative of 12α,17α-dihydroxyprogesterone.

EXAMPLE 13

*2-Acetylfuran Derivative of 12α,17α-Dihydroxyprogesterone*

Treatment of 12α,17α-dihydroxyprogesterone with 2-acetylfuran in the presence of perchloric acid as described in Example 1(a) yields the 2-acetylfuran derivative.

EXAMPLE 14

*12α,17α-Chloral Derivative of 12α,17α-Dihydroxyprogesterone*

To a suspension of 500 mg. of 12α,17α-dihydroxyprogesterone and 4 grams of chloral hydrate in 20 ml. of dioxane is added 0.1 ml. of 72% perchloric acid and the mixture agitated at room temperature for 24 hours. The mixture is filtered to remove some unreacted 12α,17α-dihydroxyprogesterone neutralized with sodium bicarbonate solution and extracted with chloroform. The chloroform dioxane extract is washed with water, dried over sodium sulfate and the solvents removed in vacuo. The residue represents the chloral derivative of 12α,17α-dihydroxyprogesterone.

EXAMPLE 15

*Trifluoroacetonide of 12α,17α-Dihydroxyprogesterone*

To a suspension of 300 mg. of 12α,17α-dihydroxyprogesterone in 3 ml. of dioxane and 3 ml. of redistilled 1,1,1-trifuloroacetone is added at 10° 0.03 ml. of 72% perchloric acid. The reaction vessel is closed and the mixture agitated for 2½ hours at room temperature. At the end of this period the mixture is neutralized with dilute sodium bicarbonate solution and extracted with chloroform. The chloroform-dioxane extract is washed with water, dried over sodium sulfate and the solvents removed in vacuo. The residual crystalline material is recrystallized from acetone-hexane.

EXAMPLE 16

*Ethyl Levulinate Derivative of 12α,17α-Dihydroxyprogesterone*

To a suspension of 400 mg. of 12α,17α-dihydroxyprogesterone in 10 ml. of redistilled ethyl levulinate is added 0.05 ml. of 72% perchloric acid and the mixture stirred at room temperature for one hour and 15 minutes, complete dissolution occurring after 50 minutes. The mixture is neutralized with dilute sodium bicarbonate solution and distributed between chloroform and water. The chloroform layer is washed with water, dried over sodium sulfate and concentrated in high vacuum to remove chloroform and excess ethyl levulinate.

EXAMPLE 17

*Levulinic Acid Derivative of 12α,17α-Dihydroxyprogesterone*

To a solution of 200 mg. of the ethyl levulinate derivative of 12α,17α-dihydroxyprogesterone in 24 ml. of methanol, which has been evacuated several times and kept under nitrogen is added 1 ml. of oxygen-free 10% potassium carbonate solution. The solution is allowed to remain at room temperature for 24 hours, after which time it is acidified with dilute sulfuric acid. Water is added and the methanol removed in vacuo. The resulting suspension is extracted with chloroform and the chloroform extract washed with three 2 ml. portions of sodium bicarbonate solution. The sodium bicarbonate extract containing the levulinic acid derivative is acidified with dilute sulfuric acid and extracted with chloroform. The chloroform extract is dried over sodium sulfate and the solvent removed in vacuo.

EXAMPLE 18

*Sodium Levulinate Derivative of 12α,17α-Dihydroxyprogesterone*

A solution of 50 mg. of the levulinic acid derivative of 12α,17α-dihydroxyprogesterone in 5 ml. of alcohol is neutralized by dropwise addition of 0.1 N sodium hydroxide. The neutral solution is freed from alcohol in vacuo, water is added and the resulting solution lyophilized. The sodium salt of the levulinic acid derivative of 12α,17α-dihydroxyprogesterone is obtained as a white powder.

EXAMPLE 19

*Methyl Glyoxylate Derivative of 12α,17α-Dihydroxyprogesterone*

Following the procedure of Example 16, but substituting methyl glyoxylate for the ethyl levulinate, there is obtained the methylglyoxylate derivative of 12α,17α-dihydroxyprogesterone.

EXAMPLE 20

Treatment of 12α,17α-dihydroxyprogesterone with 2-acetylthiophene and perchloric acid yields 12α,17α-[2′-methyl-2′-(2-thienyl)methylenedioxy]progesterone.

EXAMPLE 21

Dehydrogenation of 12α,17α-[2′-methyl-2′(2-thienyl)methylenedioxy]progesterone with 2,3-dichloro-5,6-dicyanobenzoquinone as in Example 3 yields 1-dehydro- 12α,17α - [2'-methyl-2'-(2-thienyl)methylenedioxy]progesterone.

What is claimed is:
1. A compound selected from the group consisting of

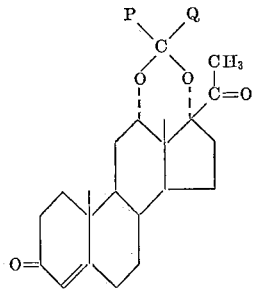 and 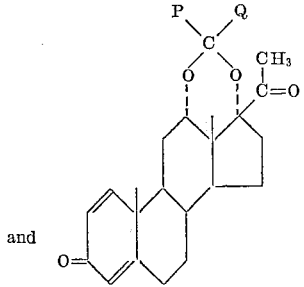

wherein P is selected from the group consisting of hydrogen, lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; Q is selected from the group consisting of lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; and together with the carbon atom to which they are joined P and Q is selected from the group consisting of cycloalkyl and monocyclic heterocyclic.

2. A compound of the formula

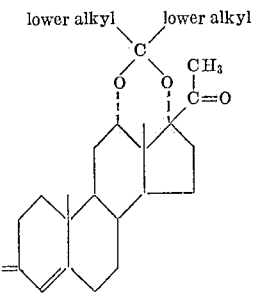

3. 12α,17α-dimethylmethylenedioxyprogesterone.
4. 12α,17α - (2' - phenyl - 2' - methylmethylenedioxy)progesterone.
5. 1 - dehydro - 12α,17α - dimethylmethylenedioxyprogesterone.
6. 1 - dehydro - 12α,17 - (2' - phenyl - 2' - methylmethylenedioxy)-progesterone.

References Cited in the file of this patent
UNITED STATES PATENTS
3,052,676    Zderic et al. _____ Sept. 4, 1962